US009400078B1

(12) United States Patent
McGowan et al.

(10) Patent No.: US 9,400,078 B1
(45) Date of Patent: Jul. 26, 2016

(54) DOCKING ASSEMBLY FOR HANDHELD COMPUTING DEVICE

(75) Inventors: Harry William McGowan, Chico, CA (US); Joseph Cole McGowan, San Rafael, CA (US)

(73) Assignee: AMBULANT, INC., San Rafael, CA (US)

( * ) Notice: Subject to any disclaimer, the term of this patent is extended or adjusted under 35 U.S.C. 154(b) by 485 days.

(21) Appl. No.: 13/350,291

(22) Filed: Jan. 13, 2012

Related U.S. Application Data

(60) Provisional application No. 61/502,278, filed on Jun. 28, 2011.

(51) Int. Cl.
*A47B 91/00* (2006.01)
*F16M 11/00* (2006.01)

(52) U.S. Cl.
CPC ..................................... *F16M 11/00* (2013.01)

(58) Field of Classification Search
USPC .......... 248/346.04, 346.07, 346.06, 924, 917, 248/918, 229.12, 444, 448, 450, 451, 464, 248/465, 682, 685, 122.1, 124.2, 316.1, 248/176.1, 176.3, 689, 688, 690, 692, 445, 248/452, 453, 455, 454, 457, 351, 670, 671, 248/447, 309.1, 316.7, 923, 919, 472, 463, 248/126, 136, 617, 490, 488, 491; 361/679.01, 679.59; 24/523, 3.13, 24/3.12, 3.1, 457; 220/737, 63, 629, 628
See application file for complete search history.

(56) References Cited

U.S. PATENT DOCUMENTS

| | | | | |
|---|---|---|---|---|
| 5,457,745 A * | 10/1995 | Wang | ............................. | 379/454 |
| 5,788,202 A * | 8/1998 | Richter | ...................... | 248/316.4 |
| 5,903,645 A * | 5/1999 | Tsay | ............................. | 379/455 |
| 6,285,758 B1 * | 9/2001 | Lu | .................................. | 379/446 |
| 6,614,908 B1 * | 9/2003 | Huang | .......................... | 379/446 |
| 6,937,463 B2 * | 8/2005 | Chung et al. | .................... | 361/607 |
| 6,959,899 B2 * | 11/2005 | Yeh | .......................... | 248/346.03 |
| 7,080,812 B2 * | 7/2006 | Wadsworth et al. | ........ | 248/316.6 |
| 7,272,984 B2 * | 9/2007 | Fan | ............................... | 74/89.17 |
| 7,407,143 B1 * | 8/2008 | Chen | .......................... | 248/309.1 |
| 7,537,190 B2 * | 5/2009 | Fan | .............................. | 248/309.1 |
| 7,551,458 B2 * | 6/2009 | Carnevali | ...................... | 361/807 |
| 7,967,269 B2 * | 6/2011 | Liu | .............................. | 248/287.1 |
| 8,074,951 B2 * | 12/2011 | Carnevali | ...................... | 248/313 |
| 8,240,628 B2 * | 8/2012 | Huang | .......................... | 248/316.1 |
| 8,424,825 B2 * | 4/2013 | Somuah | ...................... | 248/316.4 |
| 8,490,937 B2 * | 7/2013 | Crain et al. | ................. | 248/316.6 |
| 8,646,736 B2 * | 2/2014 | Berry | ............................. | 248/121 |
| 2005/0205728 A1 * | 9/2005 | Avery | ............................ | 248/149 |
| 2005/0236536 A1 * | 10/2005 | Fan | ............................. | 248/176.3 |
| 2006/0278788 A1 * | 12/2006 | Fan | .............................. | 248/309.1 |
| 2006/0290654 A1 * | 12/2006 | Wang | ............................. | 345/156 |
| 2007/0262223 A1 * | 11/2007 | Wang et al. | ............... | 248/346.07 |
| 2008/0016742 A1 * | 1/2008 | Hao | .................................. | 40/753 |
| 2009/0152428 A1 * | 6/2009 | Cilia | .......................... | 248/346.03 |
| 2010/0038514 A1 * | 2/2010 | Yu et al. | ......................... | 248/449 |
| 2010/0051771 A1 * | 3/2010 | Huang | ...................... | 248/289.11 |
| 2012/0075789 A1 * | 3/2012 | DeCamp et al. | ........... | 361/679.26 |
| 2012/0080577 A1 * | 4/2012 | McIntyre et al. | ......... | 248/346.04 |
| 2012/0320501 A1 * | 12/2012 | Ackloo | ..................... | 361/679.01 |
| 2013/0206942 A1 * | 8/2013 | Trotsky | ....................... | 248/274.1 |

* cited by examiner

*Primary Examiner* — Monica Millner

(74) *Attorney, Agent, or Firm* — Maschoff Brennan

(57) ABSTRACT

Embodiments of the present invention can be categorized as aids and/or docking assemblies for handheld electronic devices. The docking assembly described herein serves at least as (a) an aid for holding and using handheld computing appliances, and/or (b) a protective case for handheld computing appliances, and/or (c) a stand for handheld computing appliances.

18 Claims, 5 Drawing Sheets

DOCKING ASSEMBLY FOR HANDHELD COMPUTING DEVICE

CROSS REFERENCE TO RELATED APPLICATIONS

This application claims priority to provisional application 61/502,278 filed on Jun. 28, 2011. The contents of U.S. Provisional Patent Application 61/502,278 are incorporated herein by reference.

FIELD OF THE INVENTION

This present invention relates generally to docking assemblies for electronic reading (eReader) devices, and specifically to articles of manufacture that house electronic reading devices and provide means of comfortably holding and/or supporting such electronic devices.

BACKGROUND OF THE INVENTION

Embodiments of the invention described herein can serve as (a) an aid for holding and using eReaders and electronic tablets (e.g. Kindle®, Nook®, iPad®, etc) (b) a protective case for eReaders and electronic tablets, and (c) a stand for eReaders and electronic tablets. These embodiments are collectively referred to as docking assemblies. The docking assembly can be used in conjunction with numerous products, most appropriately with electronic devices; namely with eReaders. There are various stands and cases available in the market today. Typical stands secure the eReader/tablet in place and suspend it in the air using some type of support that enables it to stand freely without holding it, while cases are used primarily to protect the eReaders/tablets. However, embodiments of the present invention are different from other cases and stands: the unique design of embodiments of the docking assembly allows user to hold it with their hands or stand it on a surface, while having the added benefit of a protective case. It can be a case, a stand, but most importantly it can also be a reading aid. The docking assembly makes the eReader experience drastically more comfortable by creating numerous alternatives to gripping an electronic device, such as a Kindle®, with the thumb and fingers. The reason this docking assembly can do this is because of its unique design. The assembly can be used in countless ways, allowing the user to adjust his/her reading position as much as necessary. Most reading stands/aids are static, where the user must stay in one position to read (e.g. on their back, or in a chair, etc). This assembly, however, allows the user to be in any position they desire, and to change positions as frequently as they wish. Embodiments of the present invention are not limited to the category of a "case" or a "stand" but may best fit into a category of the "reading aid." Some companies refer to their products as "aids," even though they are really only stands. This assembly actually aids the reader in ergonomically holding their preferred reading device.

SUMMARY OF THE INVENTION

One of the purposes of the docking assembly is to relieve hand stress by requiring less pressure to grip an eReader by resting the "arms" of the assembly on your hand, or by balancing the arms or leg of the assembly on your lap, pillow, bed, chair, ground, beach or anywhere else one may decide to read. The arms are the contoured components that rest in the webbing between the index finger and the thumb, or that rest on the bed, counter, or any other surface. Whether the user is right-handed or left-handed, the docking assembly can rest on any part of the hand with little effort needed to maintain control and balance of their preferred eReader or other electronic device. Other eReader cases require the user to firmly grip the device, usually causing pain in the hand or fingers within a short time (especially for people with arthritis). Nevertheless, the webbing of the hand, just above the "thenar space" (along with other parts of the hand) is not the only place in which embodiments of the docking assembly can rest. The assembly also has the advantage of balancing freely on various surfaces such as the ones previously mentioned (table, bed, floor, counter, carpet, lawn, ground, sand, in a cup, etc). Individuals reading a Kindle® or an iPad® (or any eReader) may also want to read while laying on their right or left side, causing the user's head to be at a 45 degree angle (or thereabouts). The assembly embodiments described herein give users the option to set it at a 45 degree angle; the angle at which most people rest their head on a pillow.

One embodiment of the assembly includes two arms, left and right, and one leg (or handle) that extends from the bottom portion of the design seen in FIG. 1. Other embodiments include (a) only one arm and one leg (b) one arm and no leg (c) two arms and no leg, and (d) numerous models in which the arms/legs are placed at different locations around the edge of the assembly. For example, instead of putting the arms in the center of both sides, they can be attached near the top or bottom portion of each side, to allow for different preferred reading positions. Another embodiment can include adjustable arms and legs—ones that slide up and down the edge of the case or from side to side.

Other embodiments will be made substantially of rubber or similar substance, with flex arms and/or handle that can fold behind or in front of the eReader. Whether there are one, two, or three arms, these particular embodiments can include handles flexible enough to bend and fold in order to store the assembly in a smaller space.

The docking assembly can utilize multiple methods for fastening eReaders thereto. The following are methods and materials that could potentially be used to manufacture the assembly; whether it be used for the body of the device or used to fasten the eReader to the body of the device: 1) elastic bands to securely fasten each of the four corners of the eReading device, 2) a stretchy fabric in which the eReader can easily slide into and be securely fastened to the body of the assembly, 3) hard plastic "hooks" (as an extension of the plastic body of the assembly) that click into holes on the various styles of eReaders, 4) different size assemblies for different eReaders, 5) solid wood or bamboo assemblies to completely encase and fasten the eReader of choice (Kindle®, Nook®, etc), 6) paper—using the same unique design of the assembly, paper may be used to manufacture a variation which will be marketed and sold as a travel assembly, 7) rubber—using the same design elements described above, a rubber version of this device can be created as a less expensive and more flexible option (with one arm, two arms, three arms, etc).

Additional options and add-ons to the assembly include a Velcro® component on some portion of the assembly for use in attaching the device to whatever the user prefers (e.g. A Velcro strap on the wall, a Velcro glove, or anything else Velcro that someone would like to hang an electronic device from). Another option includes added elastic or fabric straps to the back of the assembly so that the user can insert his/her fingers into and have the assembly hang freely from their hand without requiring the user to grip it on the front and back with their fingers and thumb.

The assembly can be manufactured using various types of materials. The most likely material to be used in building the assembly is polymer-based (e.g. plastic). Other materials that can be used in the construction of the assembly are: wood, bamboo, rubber, fabric, Velcro®, metal, elastic, magnets, or paper. The type of material used in the design will depend upon customer demand, customer segments, and/or the current market price of materials. Some assemblies can be made of all plastic and rubber, while others can be made entirely of bamboo.

The assembly is a product that makes holding and using electronic readers, and other electronic devices, much easier. The unique design significantly reduces the amount of effort needed to hold and use electronic readers given the fact that embodiments of the design have "arms" and a "leg" to rest on. The assembly should be of great benefit to eReader users and many others who wish to relieve the stress of gripping an object/device.

BRIEF DESCRIPTION OF DRAWINGS

Embodiments of the invention, however, may be best understood by reference to the accompanying drawings.

DETAILED DESCRIPTION OF THE PREFERRED EMBODIMENTS

Referring to FIG. 1, which best shows the general features of a preferred embodiment of the invention, the docking assembly 10 is shown unattached to an a handheld computing appliance.

Figure 1A:
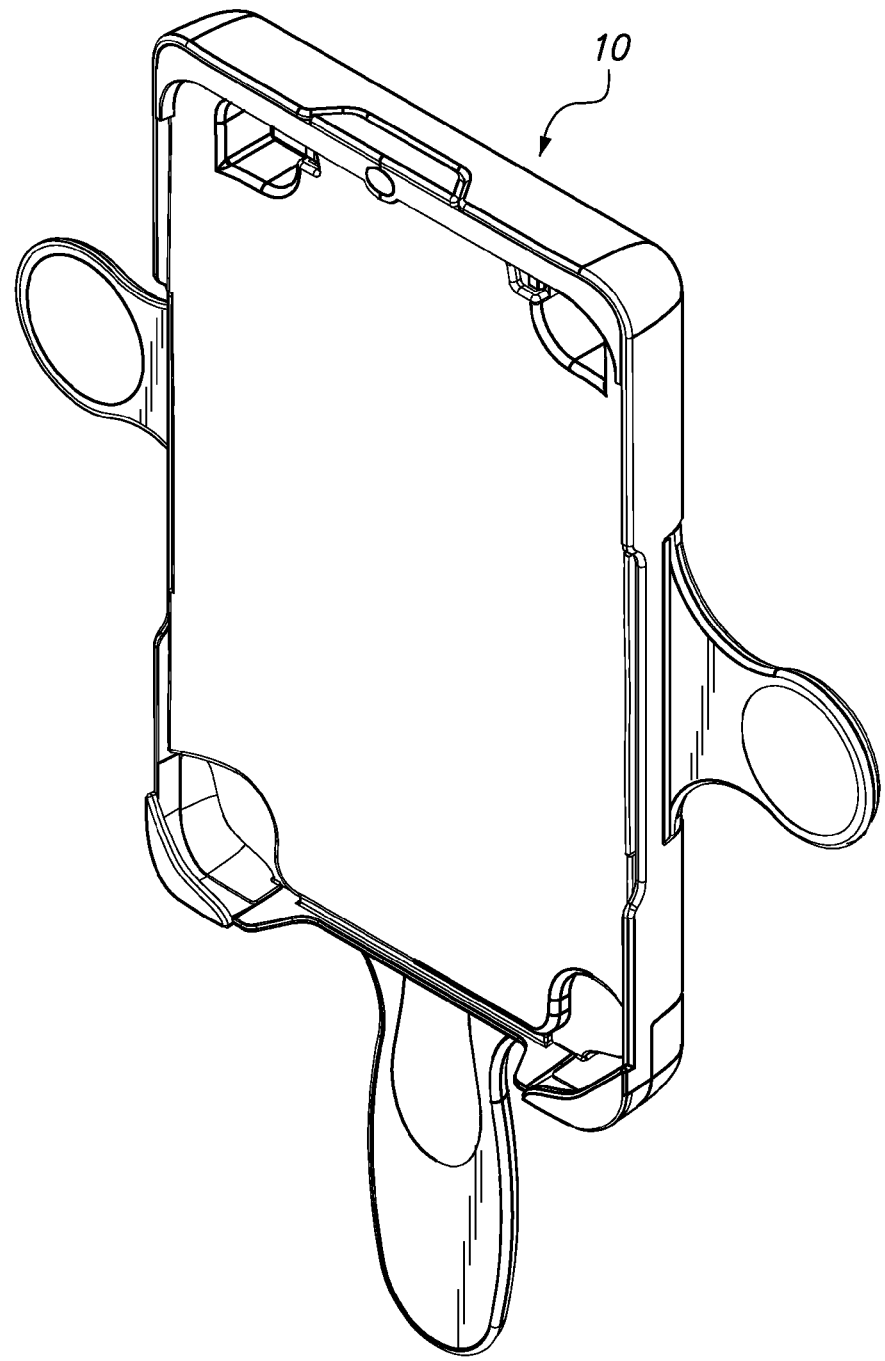
FIG. 1A is a perspective view of an embodiment of the docking assembly having two arms and one handle.
Figure 1B:
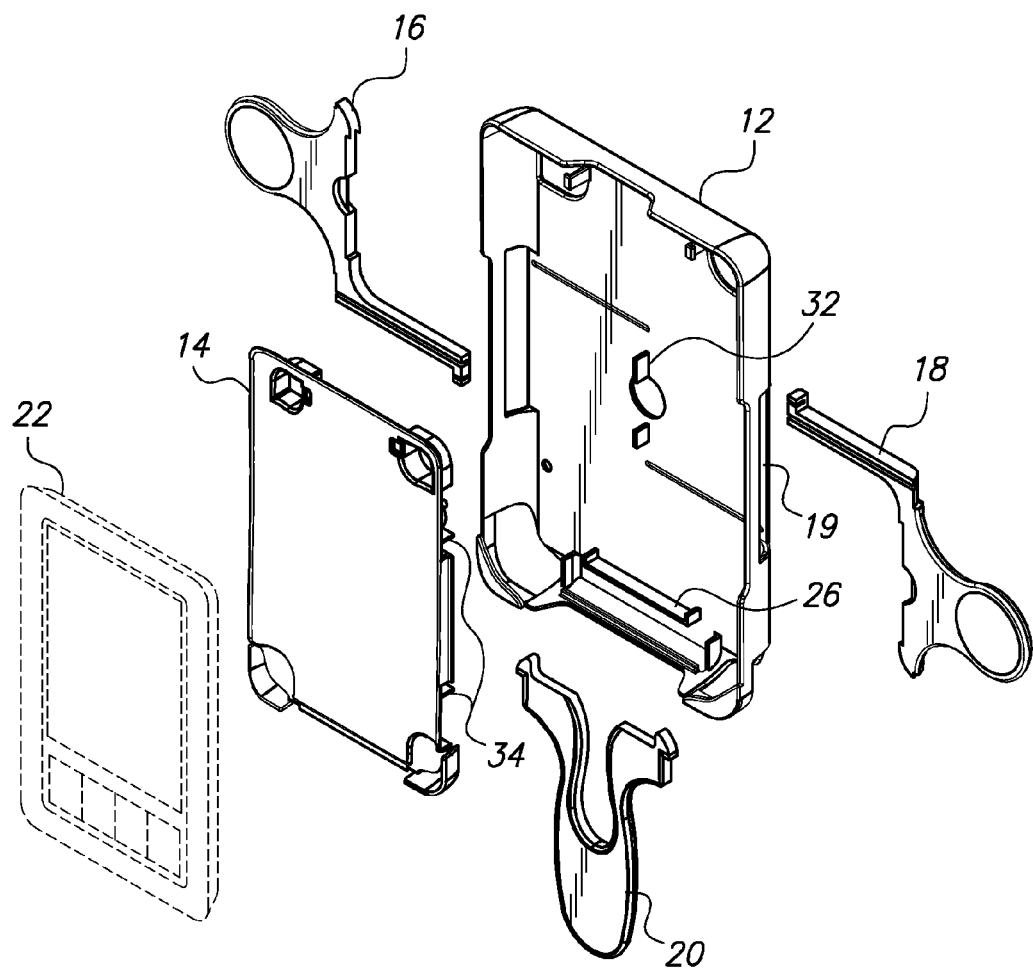
FIG. 1B is and exploded view of the embodiment shown in FIG. 1A.

The docking assembly is shown in an exploded view in FIG. 1B. The assembly 10 has a base plate/cover 12 into which is fitted an adapter plate 14. Side arms 16, 18 are retractably fitted into slots 19 in the base plate/cover. A handle 20 is attached to the bottom section of the base plate/cover. The adapter plate 14 is customized to accept a handheld computing appliance 22 (ex. an electronic reader) or similar electronic device.

Figure 2:
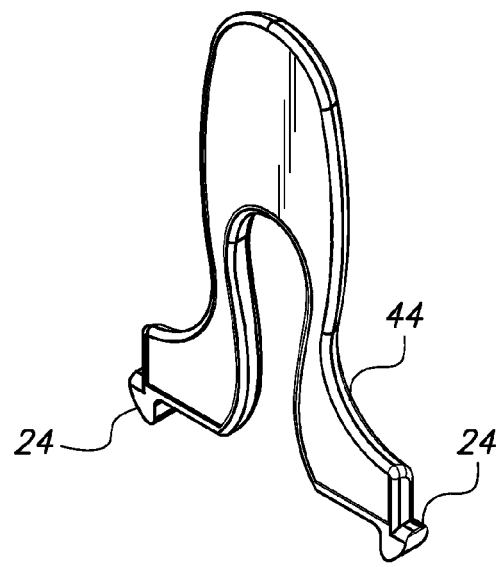
FIG. 2 shows and embodiment of a handle.

An embodiment of a handle is shown in FIG. 2. The embodiment shown has two securing features (clips) 24 that are fitted into a slot of the base plate/cover against an optional handle stop 26 attached to the cover 12. The handle embodiment shown can easily be removed when not in use. Other handle embodiments can fold out of the way or retract within the base plate/cover.

Figure 3:
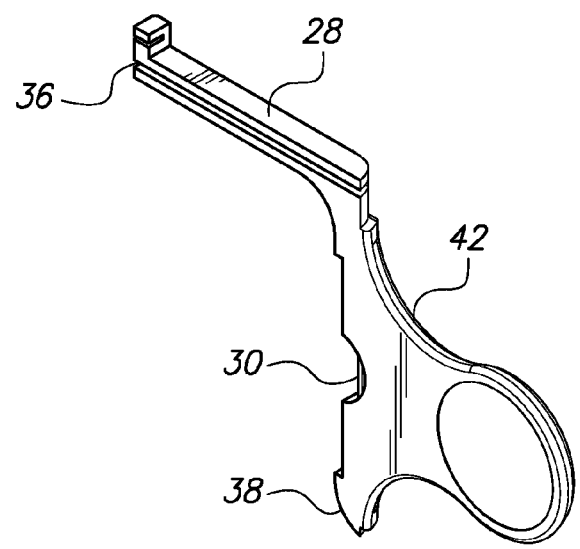
FIG. 3 shows an embodiment of an arm.

An embodiment of an arm is shown in FIG. 3. This embodiment contains a long leg component 28 that includes a slot or groove 36 which allows the arm to slide within the base plate/cover 12 along a guide rail 34 on the adapter plate 14. A shorter leg component 38 of the arm may or may not slide along a guide rail. The arm shown in FIG. 3 includes a securing feature 30 that interacts with a locking component at the base of a button 40 when the arms are fully within the base plate during storage mode. Optional handle stop components 32 are shown in FIG. 1B.

Figure 4:
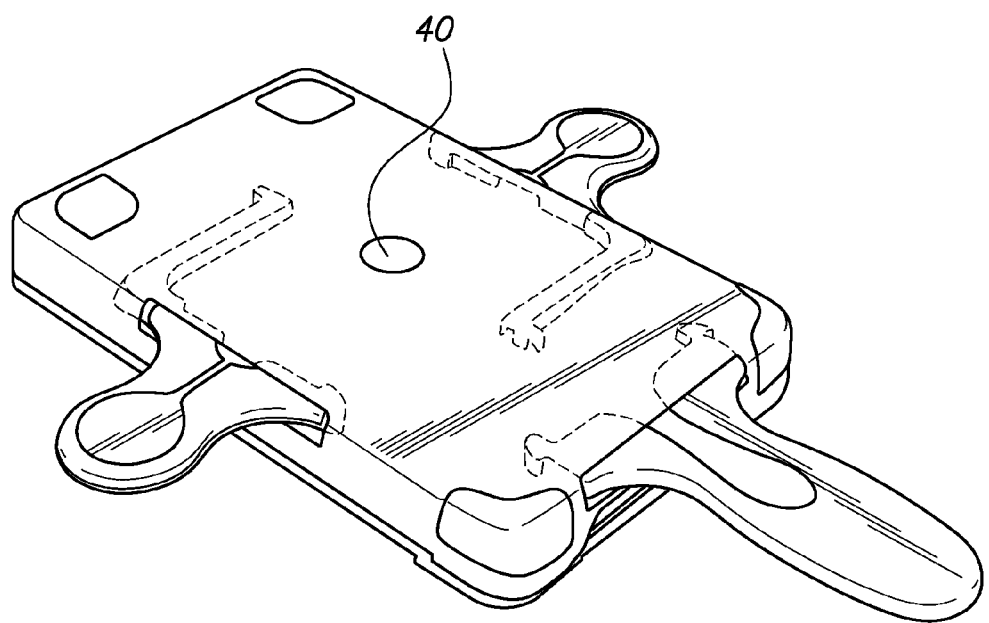
FIG. 4 shows a perspective view of the back side of the embodiment in FIG. 1A.
Figure 5:
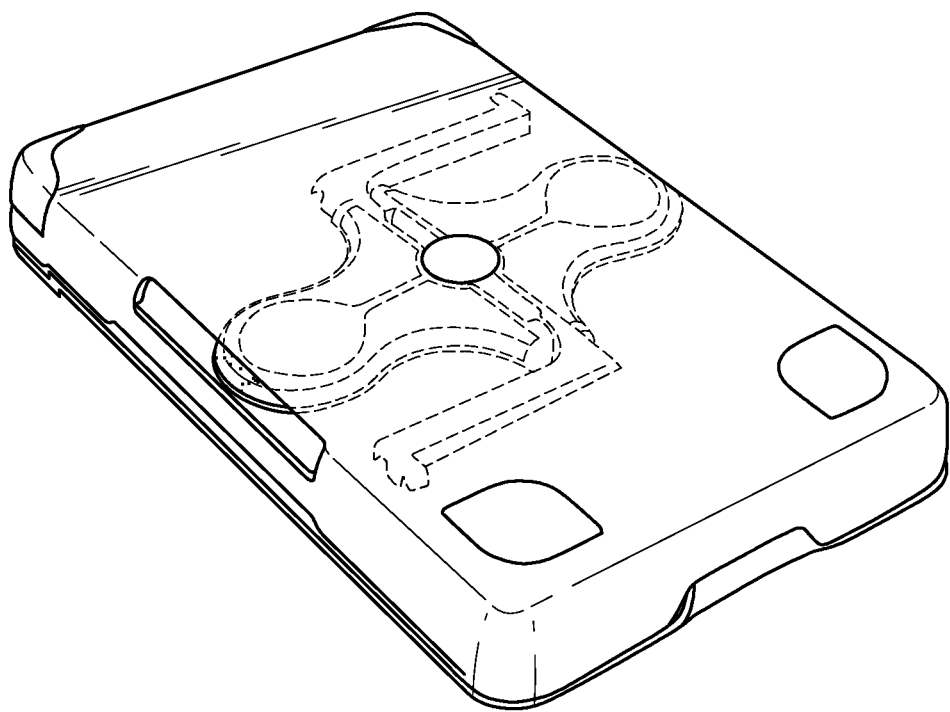
FIG. 5 shows a perspective view of the back side of the embodiment in FIG. 1A with the arms retracted and the handle removed.
Figure 6:
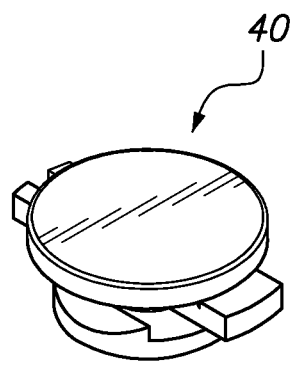
FIG. 6 shows a perspective view of a button that may be included in the docking assembly of FIG. 1A.

FIG. 4 shows a perspective view of the back side of the embodiment in FIG. 1A with the arms and handle extended for use. FIG. 5 shows a perspective view of the back side of the embodiment in FIG. 1A with the arms retracted and the handle removed. FIG. 6 shows a perspective view of a button 40 that may be included in the docking assembly of FIG. 1A.

The contoured area 42 near the base of the arm as illustrated in FIG. 3 has a radius designed to comfortably fit the thenar of the hand as previously disclosed. The range of radii (in inches) for the contoured area 40 most suited to the thenar of the hand is 0.77" plus or minus 33%. The handle similarly has a contoured area 44 that is suitable for, but not limited to, holding and/or gripping. The range of radii (in inches) for the contoured area 44 of the handle is 0.75" plus or minus 33%.

CONCLUSIONS, OTHER EMBODIMENTS, AND SCOPE OF INVENTION

Embodiments of the present invention can be adapted to house many types of handheld computer appliances including, but not limited to, the category of devices referred to as electronic readers or eReaders. Examples of such devices are the Nook® and the Kindle®. Other type of electronic devices can also be used with and enhanced by embodiments of the present invention including handheld computers, handheld surveying devices and handheld video devices.

The location of the arm(s) on the center of the left and right side of the base plate/cover has been shown in the illustrations. Placement of the arm(s) is not limited to the center of the sides of the base plate/cover. Models can also be created that have the arms located near or at the top of each side, or near the bottom of each side.

It will be obvious to those skilled in the art that modifications may be made to the embodiments described herein without departing from the scope of the present invention. Although the docking assembly for holding and housing a handheld electronic device has been described in conjunction with an electronic reader, its use is not constrained with respect to a particular electronic device. The docking assembly shown and described does not contain an electronic component as part of the assembly although addition of such a component is contemplated.

Furthermore, although preferred embodiments have been disclosed, the scope of the invention should be determined by the appended claims in the formal application and their legal equivalents, rather than by the examples given.

What is claimed is:

1. A docking assembly for a handheld computing appliance comprising:
    a casing having an open face to substantially encase the computing appliance, the open face comprising a rear wall and at least two interior sidewalls, the at least two interior sidewalls having a depth dimension that is substantially a same thickness as the computing appliance;
    a fastener configured to fasten the computing appliance to the casing within the open face; and
    an arm attached to the casing, wherein the arm in its entirety is substantially parallel with the rear wall when in a first position, the arm having at least one radius formed thereon, the radius conforming generally to the radius of a human thenar, wherein the arm is moveable to a second position such that when in the second position, the arm in its entirety is to substantially fit within the casing.

2. The docking assembly of claim 1, wherein the arm protrudes from either a left side or a right side of the casing.

3. The docking assembly of claim 1, wherein the arm protrudes from either a left side or a right side of the casing and is removably attached to the rear wall.

4. The docking assembly of claim 1, wherein the arm protrudes from either a left side or a right side of the casing and is slidably attached to the rear wall.

5. The docking assembly of claim 2, wherein the arm has a retraction leg groove along a length thereof, the groove enabling guided retraction of the arm into the casing via a guide rail disposed laterally on a back surface of an adapter plate.

6. The docking assembly of claim 1, wherein the casing serves as a cover of the computing appliance.

7. The docking assembly of claim 1, further including a handle attached to the casing, the handle protruding from a bottom side of the casing relative to a bottom side of a docked computing appliance.

8. The docking assembly of claim 5, wherein the arm includes a retention clip for retaining the arm in retracted position.

9. The docking assembly of claim 8, wherein the retention clip is retained by a locking component on a base of a button assembly installed through the rear wall of the casing.

10. The docking assembly of claim 9, wherein the arm can be retracted into the casing under spring tension when not in use and released by depressing the button assembly.

11. The docking assembly of claim 1, wherein the at least one radius is within a range of 0.77 inches+/−25%.

12. A method for docking a hand held computing appliance for ergonomic use comprising:
  (a) fitting a computing appliance onto a docking assembly, the docking assembly including:
    a casing having an open face to substantially encase the computing appliance, the open face comprising a rear wall and at least two interior sidewalls, the at least two interior sidewalls having a depth dimension that is substantially a same thickness as the computing appliance;
    a fastener configured to fasten the computing appliance to the casing within the open face; and
    an arm attached to the casing, the arm having at least one radius formed thereon, the radius conforming generally to the radius of a human thenar;
  (b) positioning the arm of the casing in a first position such that the arm in its entirety is substantially parallel with the rear wall, wherein the arm is moveable to a second position such that when in the second position, the arm in its entirety is to substantially fit within the casing; and
  (c) resting the arm of the casing against the human thenar.

13. The method of claim 12, wherein the arm protrudes from the left and or right side of the casing and is retractable when not in use.

14. The method of claim 13, wherein the arm has a retraction leg groove along a length thereof, the groove enabling guided retraction of the arm into the casing via a guide rail disposed laterally on a back surface of an adapter plate.

15. The method of claim 12, wherein in (b), positioning the arm causes the arm to protrude from a respective sidewall of the casing.

16. The docking assembly of claim 1, wherein the arm comprises a first arm and a second arm, wherein the first arm protrudes from a left side of the casing and the second arm protrudes from a right side of the casing.

17. The docking assembly of claim 1, wherein two interior sidewalls of the at least two interior sidewalls face each other.

18. The docking assembly of claim 1, wherein two interior sidewalls of the at least two interior sidewalls are a fixed distance from each other.

* * * * *